(12) United States Patent
Rebinger et al.

(10) Patent No.: US 12,589,666 B2
(45) Date of Patent: Mar. 31, 2026

(54) METHOD FOR CHARGING AN ELECTRICAL ENERGY ACCUMULATOR OF A MOTOR VEHICLE, A MOTOR VEHICLE, AND A CHARGING STATION

(71) Applicant: AUDI AG, Ingolstadt (DE)

(72) Inventors: Christian Rebinger, Munich (DE); Dirk Schroeder, Manching (DE)

(73) Assignee: AUDI AG, Ingolstadt (DE)

( * ) Notice: Subject to any disclaimer, the term of this patent is extended or adjusted under 35 U.S.C. 154(b) by 683 days.

(21) Appl. No.: 18/062,490

(22) Filed: Dec. 6, 2022

(65) Prior Publication Data

US 2023/0173933 A1 Jun. 8, 2023

(30) Foreign Application Priority Data

Dec. 7, 2021 (DE) .......................... 102021132152.2

(51) Int. Cl.
| | |
|---|---|
| *B60L 53/302* | (2019.01) |
| *B60L 58/26* | (2019.01) |
| *H01M 10/613* | (2014.01) |
| *H01M 10/625* | (2014.01) |
| *H01M 10/6568* | (2014.01) |
| *H01M 10/66* | (2014.01) |

(52) U.S. Cl.
CPC ............. *B60L 53/302* (2019.02); *B60L 58/26* (2019.02); *H01M 10/613* (2015.04); *H01M 10/625* (2015.04); *H01M 10/6568* (2015.04); *H01M 10/66* (2015.04)

(58) Field of Classification Search
CPC .... B60L 53/302; B60L 58/26; H01M 10/613; H01M 10/625; H01M 10/6568
See application file for complete search history.

(56) References Cited

U.S. PATENT DOCUMENTS

| | | | |
|---|---|---|---|
| 4,415,847 A | 11/1983 | Galloway | |
| 2020/0343610 A1* | 10/2020 | Agathocleous | ....... H01M 10/44 |

FOREIGN PATENT DOCUMENTS

| | | |
|---|---|---|
| CN | 203980737 U | 12/2014 |
| CN | 108183283 A | 6/2018 |
| DE | 4408961 C1 | 3/1995 |
| DE | 102010007975 A1 | 8/2011 |

(Continued)

*Primary Examiner* — Richard V Muralidar

(74) *Attorney, Agent, or Firm* — Seed Intellectual Property Law Group LLP

(57) ABSTRACT

A method for charging at least one electrical energy accumulator of a motor vehicle, in which electrical energy from a charging station external to the motor vehicle is transferred across a detachable electrical connection to the energy accumulator, while a cooling fluid is taken from the charging station across a detachable cooling fluid connection and by means of a delivery device to at least one cooling element of the motor vehicle, so that thermal energy is transferred from the energy accumulator across the cooling element to the cooling fluid and taken away by means of the cooling fluid, wherein a pressure in the cooling fluid or in a mixture consisting of the cooling fluid and a gas is reduced, before and/or during the supplying thereof to the cooling element, by means of at least one pressure reducing element, so that the boiling temperature of the cooling fluid is lowered such that it evaporates at least partly during the transfer of the thermal energy.

22 Claims, 2 Drawing Sheets

(56)         References Cited

FOREIGN PATENT DOCUMENTS

| DE | 102012223054 A1 | 6/2013 |
|----|-----------------|--------|
| DE | 102012220218 A1 | 5/2014 |
| DE | 102016104065 A1 | 9/2016 |
| DE | 102016117074 A1 | 3/2017 |
| DE | 102015222703 A1 | 5/2017 |
| DE | 102016101292 A1 | 7/2017 |
| DE | 102017202391 A1 | 8/2018 |
| DE | 102020204902 A1 | 11/2020 |
| EP | 2672200 A1 | 12/2013 |
| EP | 3636482 A1 | 4/2020 |

* cited by examiner

METHOD FOR CHARGING AN ELECTRICAL ENERGY ACCUMULATOR OF A MOTOR VEHICLE, A MOTOR VEHICLE, AND A CHARGING STATION

BACKGROUND

Technical Field

Embodiments of the invention relate to a method for charging at least one electrical energy accumulator of a motor vehicle, wherein electrical energy from a charging station external to the motor vehicle is transferred across a detachable electrical connection to the energy accumulator, while a cooling fluid is taken from the charging station across a detachable cooling fluid connection and by means of a delivery device to at least one cooling element of the motor vehicle, so that thermal energy is transferred from the energy accumulator across the cooling element to the cooling fluid and taken away by means of the cooling fluid.

Description of the Related Art

Motor vehicles with rechargeable electrical energy accumulator, particularly batteries, which are coordinated with an electric motor during operation and are known as traction batteries, are known in the prior art. Thus, besides pure electric vehicles in which the electric motor constitutes the sole drive mechanism, there are hybrid vehicles which also have other drive mechanisms in addition to the electric motor, such as a combustion engine. For electric vehicles and so-called plug-in hybrids it is known that the motor vehicle comprises a charging port for connection to a charging station external to the motor vehicle, such as a fixed charging point. By means of the charging station, electrical energy is furnished to the motor vehicle, such as from the public power supply grid, in order to charge the energy accumulator.

A constant problem in connection with electrical energy accumulators of motor vehicles is that they become heated in certain operating phases, making a corresponding battery cooling necessary. One such operating phase is the driving operation, during which energy is provided from the energy accumulator in order to create a propulsion power for the motor vehicle, whereby it becomes discharged. A heating also occurs during the charging of the energy accumulator, this problem arising during recuperation and more intensely during so-called rapid charging, when the empty energy accumulator has reached an adequate state of charge for further driving already after a few minutes of charging time. A distinctly stronger heating of the energy accumulator occurs in this case as compared to "normal" charging methods or the driving operation.

Cooling systems at the motor vehicle side are often provided for the cooling of the energy accumulator, in which a cooling is brought about by means of a circulating cooling fluid and/or a flow of cooling air. However, the operation of the cooling system alone on the motor vehicle side, such as in the case of the described rapid charging, is often not enough to provide the actually needed cooling performance. Regarding charging processes at charging stations, it is known from the prior art as the solution for this problem how to provide a cooling fluid on the part of the charging point and take this to the electrical energy accumulator of the motor vehicle. Corresponding concepts are known, for example, from DE 10 2012 220 218 A1, DE 10 2010 007 975 A1, U.S. Pat. No. 4,415,847 A and US 2020/0 343 610 A1.

A corresponding charging device for the cooling and charging of a battery of a vehicle is furthermore known from DE 10 2017 202 391 A1. In this system, the battery is supplied with a liquid cooling medium, namely, liquid $CO_2$, with a boiling temperature which is less than the temperature of the battery. For this, the cooling medium is placed under pressure in order to raise the boiling temperature. The cooling medium escapes into the ambient air after having been converted to the gaseous state.

BRIEF SUMMARY

Some embodiments provide an improved or further developed concept in regard to the cooling of an electrical energy accumulator of a motor vehicle during the charging process at a charging station.

In a first embodiment of a method, a pressure in the cooling fluid or in a mixture consisting of the cooling fluid and a gas is reduced, before and/or during the supplying thereof to the cooling element, by means of at least one pressure reducing element, so that the boiling temperature of the cooling fluid is lowered such that it evaporates at least partly during the transfer of the thermal energy.

In some embodiments, it is provided that the transfer of the thermal energy from the energy accumulator across the cooling element to the cooling fluid brings about not only a mere heating, but also an evaporating of the cooling fluid. By evaporating is meant the passing of the cooling fluid from the liquid to the gaseous state, which is brought about thanks to exceeding the boiling temperature of the cooling fluid. Thus, the cooling fluid after the transfer of the thermal energy is present in particular as a two-phase mixture, comprising a liquid and a gaseous phase. In order to convert a fluid in an evaporation or boiling from the liquid to the gaseous state, energy is needed, which is also known as the evaporation enthalpy or heat of evaporation. Thus, the entire thermal energy carried away by means of the cooling fluid is composed of the energy bringing about the heating of the liquid cooling fluid and the energy bringing about the evaporating of the cooling fluid.

The boiling temperature of the cooling fluid depends on the pressure present in the fluid. Thus, reducing the pressure in the cooling fluid brings about a lowering of the boiling point, and vice versa. In the first embodiment of the method, it is provided that the pressure in the cooling fluid is reduced before or during the supplying thereof to the cooling element, so that the boiling temperature of the cooling fluid falls below a temperature of 30° C., for example, such as the energy accumulator or the cooling element normally has during the charging operation. Thus, the reduction of the pressure makes it possible to use, as the cooling fluid, a liquid whose boiling temperature is not reached under normal conditions, i.e., atmospheric pressure and a typically prevailing temperature of around 20° C. Thus, water may be used as the cooling fluid, which is advantageous as compared to other liquids typically used as a cooling fluid on account of the low costs and the environmental friendliness. Furthermore, it is not necessary in the case of water as the cooling fluid for this to be pressurized constantly in the course of its storage in order to ensure that the cooling fluid will maintain the liquid state of aggregation. Instead, the conditioning of the cooling fluid by the pressure reduction is provided only in actual use, i.e., immediately prior to the cooling of the energy accumulator.

The first embodiment of the method described herein allows for the cooling of an energy accumulator of a motor vehicle during the charging process at a charging station, in which an evaporating of the cooling fluid results in a boosted efficiency of the cooling effect and simplifies the storage and use of the cooling fluid provided for the evaporation as compared to the known concepts of the prior art.

In the first embodiment of the method described herein, it can be provided that the pressure reducing element is an expansion element, being configured in one variant design as a throttle. In addition or alternatively, the reducing element can be a turbine, by which energy is removed from the cooling fluid or the mixture. The energy recovered in this way can be used, for example, to operate the delivery device.

In a second embodiment of a method it is proposed, in the method of the kind mentioned above to solve the problem, that cooling fluid evaporating during the transfer of the thermal energy circulates at least partly in a circuit in which the cooling element is included.

In this embodiment, therefore, a return of the cooling fluid occurs at least partly, so that it can be used once more for this purpose after the transfer of the thermal energy. The cooling fluid can be conditioned, i.e., cooled, for example, in the course of its circulation in the circuit, so that it can be used again for the transfer of the thermal energy. All of the cooling fluid may be circulating in the circuit, so that in this case a closed system exists. Alternatively, it can also be provided that only a portion of the cooling fluid is circulating in the circuit, while another portion of the cooling fluid is given off to the surroundings. In this case, there is a partially closed or partially open system.

Thus, also the second embodiment of the method, just as in the case of the first embodiment, realizes a possibility for the cooling of an energy accumulator of a motor vehicle during the charging process at a charging station, in which an evaporating of the cooling fluid results in a boosted efficiency of the cooling effect and simplifies the storage and use of the cooling fluid as compared to the known concepts of the prior art. Thus, in the second embodiment, there is a repeated utilization of the cooling fluid, whereas in the prior art the cooling fluid is taken away after the evaporation and therefore new cooling fluid must be constantly replenished.

In the second embodiment of the method it is provided that a cooling appliance which cools down the cooling fluid after the transfer of the thermal energy is included in the circuit, such as a closed circuit. The cooling appliance can be a condenser, for example. In turn, the cooler itself can be incorporated in a cooling circuit or it can be cooled, for example, with ambient air, supplied to the cooler, say by means of a fan.

The features explained in the following may be used for both embodiments of the method described herein. Moreover, they may be realized in combination with regard to both embodiments.

The cooling fluid is taken by means of the delivery device, which can be, for example, a pump or a compressor, from the cooling fluid reservoir or the cooling fluid source to the cooling element. The delivery device may be a component of the charging station. The delivery device is incorporated in particular in the circuit and brings about the circulation of the cooling fluid or mixture in the circuit.

The cooling element can also be supplied with a mixture of a first and at least one further cooling fluid or alternatively a mixture of the cooling fluid and the gas, instead of the pure cooling fluid. Ambient air can be used as the gas, since ambient air is available in almost unlimited amount and therefore is extremely environmentally friendly. Thus, upon changing of the cooling fluid from the liquid to the gaseous state, a sudden volume expansion of the evaporating fluid occurs. The gas in this mixture of cooling fluid and gas brings about a certain buffer effect, so that on the one hand the volume expansion does not lead directly to so strong a pressure rise that the boiling temperature of the cooling fluid would increase in undesirable manner. On the other hand, components such as pipelines and the like are protected by this buffer effect against excessive wear. Specifically, it can be arranged that a gas supply line empties into a cooling fluid line, such as one of the circuit, while ambient air as the gas is taken in from the surroundings by means of a gas delivery device of the charging station or the motor vehicle.

Although the charging station can be mobile, it may also be fixed in place or stationary, and the fixed charging station can also be called a charging point. The charging station is connected to an energy source, such as a public power grid and/or a photovoltaic layout or the like. A charging cable is used to form the detachable electrical connection between the charging station and the motor vehicle, the connection being designed as a corresponding plug and socket. The cable can be connected firmly to the motor vehicle or firmly to the charging station or it may also have a corresponding detachable plug at both ends.

As already mentioned, water may be used as the cooling fluid. In the second embodiment, alternatively, $CO_2$ can be used as the cooling fluid, such as to increase the boiling point with pressure. Although other coolants may be used in regard to the use of the cooling fluid, water and $CO_2$ are advantageous, since these substances and chiefly water are nonproblematical from the ecology standpoint and favorable in cost from an economical standpoint.

The charging station can comprise a cooling fluid reservoir and/or be connected to a cooling fluid source. The cooling fluid can be taken by means of the delivery device from the cooling fluid reservoir or the cooling fluid source to the cooling element. The cooling fluid reservoir can be a tank, such as a water tank. In this case, the cooling fluid can be replenished appropriately, say during regular maintenance procedures. The cooling fluid source can be a public water supply network and/or a rain water catchment, to which the charging station is connected. In particular, the charging station can comprise both a cooling fluid reservoir and be connected to the cooling fluid source. Thus, the cooling fluid reservoir, as soon as or not later than when the fill level of the cooling fluid falls below a given minimum level, can be automatically filled by means of the cooling fluid from the cooling fluid source, for which electronic sensor, control, and valve mechanisms can be provided. The automatic replenishing may take place by means of a float located in the cooling fluid reservoir in the manner of a toilet flush tank.

In the method described herein it can be provided that the cooling fluid or the mixture is supplied partially or entirely after the transfer of the thermal energy to a phase separator of the motor vehicle, by means of which a liquid phase, consisting of the liquid cooling fluid, and a gaseous phase, consisting of the evaporated cooling fluid, of the cooling fluid or the mixture are separated from each other. Details regarding the design and function of the phase separator are sufficiently well known to the person skilled in the art and shall not be further explained in this place. The phase separator makes it possible for the liquid and the gaseous phase of the mixture of cooling fluid and gas or the two-phase cooling fluid to proceed further and separately after the transfer of the thermal energy.

As a modification of this, it can be provided that the gaseous phase is discharged into the surroundings. In particular, when the gas is ambient air or carbon dioxide, a return to the charging station is not absolutely necessary. Instead of this, it may be provided that fresh ambient air, not saturated with cooling fluid vapor, is supplied to the cooling fluid before the transfer of the thermal energy, thus forming the mixture of cooling fluid and gas.

The gaseous phase can be discharged into the surroundings by a gas phase discharge line, leading from the phase separator to a gas phase vent opening of the motor vehicle or the charging station. It may be provided here that the delivery device is situated in the region of the gas phase discharge line. The delivery device can be a gas pump, which creates a partial vacuum in the region of the phase separator and the cooling element, driving or bringing about the circulation of the cooling fluid in the circuit and/or the reduction in pressure downstream from the pressure reducing element.

As regards the separated liquid phase, it may be supplied to the liquid cooling fluid prior to the transfer of the thermal energy. Thus, the liquid phase moves through a circuit which, if the gaseous phase is taken away to the surroundings, can be called a "half-open" circuit. The liquid phase can be supplied to the cooling fluid reservoir of the charging station or to a cooling fluid line at the charging station side. In some embodiments, however, the liquid phase is fed into the liquid cooling fluid at the motor vehicle side, for example, directly into the cooling element or into a cooling fluid line leading to the cooling element, since in this case no return connection is needed for the cooling fluid to the motor vehicle. Insofar as the cooling fluid circulates solely in a circuit at the motor vehicle side, the quantity of cooling fluid which needs to be transferred by means of the cooling fluid connection between the motor vehicle and the charging station will be less, so that the corresponding connection line can be smaller in dimension.

The cooling element can be a cooling plate standing in thermal contact with the energy accumulator. Upon heating of the energy accumulator, thermal energy is transferred to the cooling plate, and the cooling fluid is once again in thermal contact with the cooling plate, so that the thermal energy is transferred to the cooling fluid. The cooling fluid or the mixture can flow through cooling ducts formed along one surface of the cooling plate. In addition or alternatively, the cooling plate can be riddled with cooling ducts, through which the cooling fluid or the mixture flows.

The cooling element can be a heat exchanger, by means of which thermal energy is transferred from a coolant circulating in a cooling circuit for the cooling of the energy accumulator to the cooling fluid. The cooling circuit of the motor vehicle can either be provided solely for the transfer of thermal energy from the energy accumulator to the heat exchanger or as an active cooling circuit. "Active" means here that the cooling circuit itself already provides a cooling effect and works somewhat on the principle of a refrigerator. The cooling circuit can be designed and provided in particular for cooling of the energy accumulator in a driving mode of the motor vehicle. The cooling effect which can be realized by means of the cooling circuit during the charging process is accordingly intensified in the method described herein.

Furthermore, the energy accumulator may stand in thermal contact with at least one further cooling element, which is incorporated in a separate cooling circuit. The separate cooling circuit can be operated independently of the cooling circuit. Hence, both cooling elements and cooling circuits can work independently and separately from each other, the separate cooling circuit being provided for cooling the energy accumulator in a driving mode of the motor vehicle.

Some embodiments relate to a motor vehicle, comprising at least one electrical energy accumulator, an electrical interface, such as a charging socket, to form a detachable electrical connection, by means of which electrical energy can be transferred from a charging station external to the motor vehicle to the energy accumulator, and a cooling fluid interface, such as a connector, to form a detachable cooling fluid connection, by means of which a cooling fluid can be taken from the charging station by means of a delivery device to at least one cooling element of the motor vehicle, so that thermal energy can be transferred from the energy accumulator across the cooling element to the cooling fluid and taken away by means of the cooling fluid.

According to a first embodiment of a motor vehicle it is furthermore provided that this is configured to carry out the first embodiment of the method described herein. Moreover, in the first embodiment of the motor vehicle described herein it is provided that the motor vehicle comprises the pressure reducing element and/or a phase separator, to which the cooling fluid or the mixture can be supplied partially or entirely after the transfer of the thermal energy and by means of which a liquid phase, consisting of the liquid cooling fluid, and a gaseous phase, consisting of the gaseous cooling fluid and/or the gas, of the cooling fluid or the mixture can be separated from each other.

If the motor vehicle described herein should comprise the phase separator, it can be provided that it comprises a liquid phase discharge line, which leads from the phase separator to the cooling element and/or to the or to a cooling fluid line leading to the cooling element, whereby the liquid phase can be supplied by means of the liquid phase discharge line to the liquid cooling fluid at the motor vehicle side and before the transfer of the thermal energy. In addition or alternatively, it can be provided that the motor vehicle described herein comprises a gas phase discharge line, leading from the phase separator to a gas phase vent opening of the motor vehicle, whereby the gaseous phase can be discharged into the surroundings by means of the gas phase discharge line, in which the delivery device is arranged in particular. The gas phase vent opening can be situated, for example, in the area of the subfloor or the outer skin of the motor vehicle, in particular being covered by a scoop or the like.

According to a second embodiment of a motor vehicle it is furthermore provided in a motor vehicle as described above that this is configured to carry out the second embodiment of the method described herein. Moreover, in the second embodiment of the motor vehicle it is provided that this comprises a return connection interface, by means of which a detachable return connection is formed from the motor vehicle to the charging station, through which the cooling fluid or the mixture can be taken after the transfer of the thermal energy in order to form the circuit. In addition or alternatively, it can be provided in this embodiment that the motor vehicle comprises a liquid phase discharge line, which leads from a phase separator to the cooling element and/or to the or to a cooling fluid line leading to the cooling element and by means of which a liquid phase of the cooling fluid or the mixture can be supplied to the liquid cooling fluid at the motor vehicle side and before the transfer of the thermal energy in order to form the circuit.

All features, benefits and aspects explained in connection with the methods described herein can be applied equally to the motor vehicles described herein and vice versa.

Some embodiments relate to a charging station for charging at least one electrical energy accumulator of a motor vehicle, comprising an electrical interface, such as a charging cable with a plug, to form a detachable electrical connection, by means of which electrical energy from a charging station external to the motor vehicle can be transferred to the energy accumulator, and a cooling fluid interface, such as a hose with a connector plug, to form a detachable cooling fluid connection, by means of which a cooling fluid can be taken from the charging station by means of a delivery device to at least one cooling element of the motor vehicle, so that thermal energy can be transferred from the energy accumulator across the cooling element to the cooling fluid and taken away by means of the cooling fluid.

According to a first embodiment of a charging station it is furthermore provided that this is configured to carry out the first embodiment of the method described herein. In the first embodiment of the charging station described herein it is furthermore provided that this comprises the pressure reducing element and/or a phase separator, to which the cooling fluid or the mixture can be supplied partially or entirely after the transfer of the thermal energy and by means of which a liquid phase, consisting of the liquid cooling fluid, and a gaseous phase, consisting of the gaseous cooling fluid and/or the gas, of the cooling fluid or the mixture can be separated from each other.

Insofar as a charging station comprises the phase separator, it can be provided that it comprises a liquid phase discharge line, which leads from the phase separator to a cooling fluid reservoir and/or to the or to a cooling fluid line leading to the cooling fluid interface, wherein the liquid phase can be supplied by means of the liquid phase discharge line to the liquid cooling fluid at the charging station side and before the transfer of the thermal energy. In addition or alternatively it can be provided that the charging station described herein comprises a gas phase discharge line, leading from the phase separator to a gas phase vent opening of the charging station, whereby the gaseous phase can be discharged into the surroundings by means of the gas phase discharge line, such as across a gas phase vent opening of the charging station.

According to a second embodiment of a charging station it is furthermore provided in the charging station as described above that this is configured to carry out the second embodiment of the method described herein. In the second embodiment of the charging station it is furthermore provided that this comprises a return connection interface, such as a hose with a connector plug, by means of which a detachable return connection can be formed from the motor vehicle to the charging station, by which the cooling fluid or the mixture is taken after the transfer of the thermal energy in order to form the circuit.

The features, benefits and aspects explained in connection with the methods described herein and the motor vehicles described herein can be applied equally to the charging stations described herein and vice versa.

BRIEF DESCRIPTION OF THE SEVERAL VIEWS OF THE DRAWINGS

Further benefits and details will emerge from the following described embodiments as well as the drawings.

DETAILED DESCRIPTION

The schematic FIGS. 1 to 4 show each time an arrangement of a motor vehicle 1 and a charging station 2 in several embodiments. What is explained for the individual figures holds equally for the other respective figures, unless otherwise explicitly stated.

Figure 1:
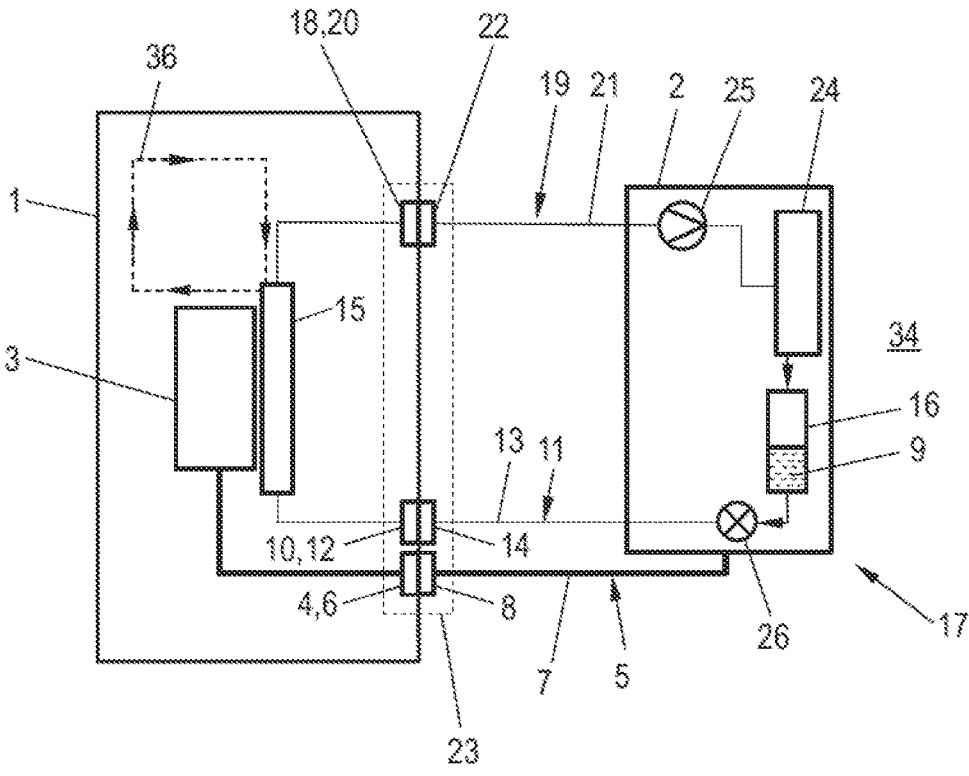
FIG. 1 shows a first embodiment of a motor vehicle and a first embodiment of a charging station to explain a first embodiment of a method.

The motor vehicle 1 shown in FIG. 1 is an electric vehicle having an electrical energy accumulator 3 configured as a traction battery. The motor vehicle 1 in the condition shown is electrically detachably connected to the charging station 2 for charging the energy accumulator 3. The charging station 2 is a fixed charging point, being connected to an energy source, such as a public power grid and/or a solar layout or the like, not otherwise shown in FIG. 1.

In order to form the detachable electrical connection between the motor vehicle 1 and the charging station 2 there is provided an electrical interface 4 on the side with the motor vehicle 1 and an electrical interface 5 on the side with the charging station 2. The electrical interface 4 on the motor vehicle side is designed as a charging socket 6 and the electrical interface 5 on the charging station side is designed as a charging cable 7 with a plug which can be inserted into the charging socket 6. Although in the embodiments shown the charging cable 7 is firmly connected to the charging station 2 and constitutes a component thereof, the charging cable 7 may be a separate component, configured to form a corresponding plug-in connection at both ends, namely, with the motor vehicle 1 at one end and with the charging station 2 at the other end.

The motor vehicle 1 is moreover connected to the charging station 2 by a detachable cooling fluid connection, by means of which a cooling fluid 9 can be taken from the charging station 2 to the motor vehicle 1. In the present case, water is used as the cooling fluid 9. In order to form the cooling fluid connection, a cooling fluid interface 10 of the motor vehicle 1 and a cooling fluid interface 11 of the charging station 2 are provided. The cooling fluid interface 10 at the motor vehicle side is configured as a connector 12 and the cooling fluid interface 11 at the charging station side as a hose 13 with a connector plug 14, which can be inserted into the connector 12.

By means of the cooling fluid connection, the cooling fluid 9 can be taken from the charging station 2 to a cooling element 15 of the motor vehicle 1. The cooling element 15 in the embodiments is formed as a cooling plate standing in thermal contact with the energy accumulator 3, through which cooling ducts run, not being otherwise shown. The cooling fluid 9 after being supplied to the cooling element 15 runs through the cooling ducts. In this process, thermal energy is transferred from the energy accumulator 3 to the cooling element 15 and from the cooling element 15 back to the cooling fluid 9, so that a cooling of the energy accumulator 3 occurs during the charging process of the motor vehicle 1.

As regards the cooling element 15, it may be a heat exchanger, which is incorporated in a cooling circuit 36 independent of the charging station and provided on the part of the motor vehicle 1. The cooling circuit 36 is shown by hatching in FIG. 1, leaving out further components incorporated in it. A coolant circulates in the cooling circuit 36, so that thermal energy is transferred from the energy accumulator 3 to a cooling plate standing in thermal contact with the energy accumulator 3 and incorporated in the cooling circuit 36, having the coolant flowing through it. After this, the coolant flows through the heat exchanger, thereby transferring the heat to the cooling fluid 9 flowing through the heat exchanger.

The cooling circuit 36 of the motor vehicle 1 can be provided solely to transfer thermal energy from the energy accumulator 3 to the cooling element 15. Alternatively, the cooling circuit 36 can be provided as an active cooling circuit, where "active" means that a further cooling effect for the coolant occurs additionally in the cooling circuit 36 itself, apart from the cooling element 15. Thus, the cooling circuit 36 can work on the principle of a refrigerator. A further heat exchanger may be incorporated in the cooling circuit 36, which is coupled in turn to a refrigerant circuit. The cooling circuit 36 can have a further heat exchanger, in which the coolant is cooled, by means of air cooling for example. The cooling circuit 36 can be designed and provided in particular to cool the energy accumulator 3 in a driving mode of the motor vehicle 1. The cooling effect realized by means of the cooling circuit 36 during the charging process is accordingly intensified in the method described herein.

The energy accumulator 3 may stand in thermal contact with at least one further cooling element, not shown in the figures, which is in turn incorporated in a separate cooling circuit. In this case, the cooling element 15 is present to control the temperature of the energy accumulator 3, in addition to the further cooling element not shown, and both cooling elements can work independently and separately from each other. Thus, the further cooling element and the separate cooling circuit can also be present and work detached from the cooling element 15.

The charging station 2 comprises a cooling fluid reservoir 16 provided as a water tank to receive the cooling fluid 9. Alternatively to the cooling fluid reservoir 16, the charging station 2 can be connected to a cooling fluid source such as a public water supply network. This can also be the case in the embodiments shown at present, so that the cooling fluid reservoir is automatically filled as soon as the level of the cooling fluid 9 in the cooling fluid reservoir 16 falls below a given minimum level. Further, the filling of the cooling fluid reservoir 16, insofar as water is used as the cooling fluid 9, may collect rain water by means of appropriate catchment devices. A filling of the cooling fluid reservoir 16 when precipitation occurs can be done until the reservoir 16 is entirely full. In this regard, conditioning devices can be provided in the form of particle and/or dirt filters, for example, in order to condition the precipitation.

Regarding FIG. 1, the cooling fluid 9 circulates in a circuit 17, which runs from the charging station 2 to the motor vehicle 1 and back. Thus, for this purpose, the motor vehicle 1 and the charging station 2 are moreover connected by a detachable return connection. To produce this, the motor vehicle 1 comprises a return connection interface 18 and the charging station 2 comprises a return connection interface 19. The return connection interface 18 at the motor vehicle side is configured as a connector 20 and the return connection interface 19 at the charging station side is configured as a hose 21 with a connector plug 22.

The components 6, 8, 12, 14, 20 and 22 of the plug-in connections described in connection with FIG. 1 can be provided as one common plug-in connection 23, so that a user when connecting the motor vehicle 1 to the charging station 2 does not need to connect multiple plugs separately, but only a single plug. The common plug-in connection 23 is shown schematically in the figures by a hatched box. The charging cable 7 as well as the hoses 13 and 21 may also be bundled together as one common multistrand connection line. As already explained above in connection with the charging cable 7, the common connection line may be a separate component, designed to form one common plug-in connection at both ends, namely, to the motor vehicle 1 at one end and to the charging station 2 at the other end.

In the following, details regarding the circuit 17 shall be described. First of all, the cooling fluid 9 is received in the cooling fluid reservoir 16 of the charging station 2, which can be viewed as the starting point of this circuit. The cooling fluid reservoir 16 is then connected to a pressure reducing element 26, designed as a throttle, by means of which the pressure in the cooling fluid 9 is reduced upon passing through this site. The pressure reducing element 26 may be a turbine, by means of which energy is withdrawn from the cooling fluid, being used, for example, to operate a delivery device 25, which will be further discussed below. From the pressure reducing element 26, the cooling fluid 9 flows through the cooling fluid connection, i.e., across the cooling fluid interfaces 10, 11, to the cooling element 15, where it takes up the thermal energy of the energy accumulator 3. From here, the cooling fluid 9 then flows across the return connection, i.e., across the return connection interfaces 18, 19, back to the charging station 2. There, it first flows through the delivery device 25, which in the present case is a pump or a compressor, depending on the cooling fluid 9 used, and by this means the circulation of the cooling fluid 9 in the circuit 17 is driven. Next, the cooling fluid 9 moves through a cooler 24, which in the present case is a condenser, in which the cooling fluid 9 is cooled down and condensed. The cooler 24 is air cooled, for example, or operated accordingly with a further coolant. Next, the cooled down cooling fluid 9 is supplied to the cooling fluid reservoir 16 and the circuit 17 is closed.

The pressure reduction of the cooling fluid 9 by the pressure reducing element 26 has the effect that the boiling temperature of the cooling fluid 9 or the water is lowered, so that the cooling fluid 9 at least partially evaporates or boils during the transfer of the thermal energy in or at the cooling element 15. Thus, the cooling fluid 9 is present in the circuit 17, after the cooling element 15, as a two-phase mixture of liquid and gaseous cooling fluid 9. If the cooling fluid 9 has evaporated completely, it is present from this point on as a pure cooling fluid gas. Additional energy is needed for the evaporation, also known as the evaporation enthalpy, so that the cooling effect of the cooling fluid 9 on the cooling element 15 or the energy accumulator 3 is enhanced.

In the following, details shall be explained regarding the arrangement shown in FIG. 2. In this embodiment, the cooling fluid 9 is supplied, after the transfer of the thermal energy and after flowing through the return connection, to a phase separator 27 of the charging station 2, by means of which a liquid phase 28, consisting of the liquid cooling fluid 9, and a gaseous phase 29, consisting of the gaseous cooling fluid 9, of the cooling fluid 9 are separated from each other.

The charging station 2 comprises a liquid phase discharge line 30, which leads from the phase separator 27 to a cooling fluid line 31, leading to the cooling fluid interface 11, so that the liquid phase 28 is supplied to the liquid cooling fluid 9 at the charging station side and before the transfer of the thermal energy. Alternatively, the liquid phase discharge line 30 may lead to the cooling fluid reservoir 16. If a natural cooling fluid inflow through the liquid phase discharge line 30 into the intake line section or hose 13 cannot be assured, such as one brought about by the pressure conditions occurring any way in the pipelines and/or by means of gravity, assistance can be provided by another delivery element, e.g., one provided in the liquid phase discharge line 30.

The charging station 2 moreover comprises a gas phase discharge line 32, which leads from the phase separator 27 to a gas phase vent opening 33 of the charging station 2, arranged at the side thereof, for example. The gaseous phase 28 is discharged into the surroundings 34 of the layout across the gas phase discharge line 32 and the gas phase vent opening 33. The delivery device 25 in this embodiment is arranged in the region of the gas phase discharge line 32. That is, the partial vacuum arising behind the delivery device takes care of the circulation of the cooling fluid 9 in the circuit 17. Since in the system shown in FIG. 2 only a portion of the cooling fluid 9 circulates in the circuit 17 and the other portion, i.e., the gaseous phase 29, is taken away to the outside, this system can also be called partially closed or partially open.

Figure 2:
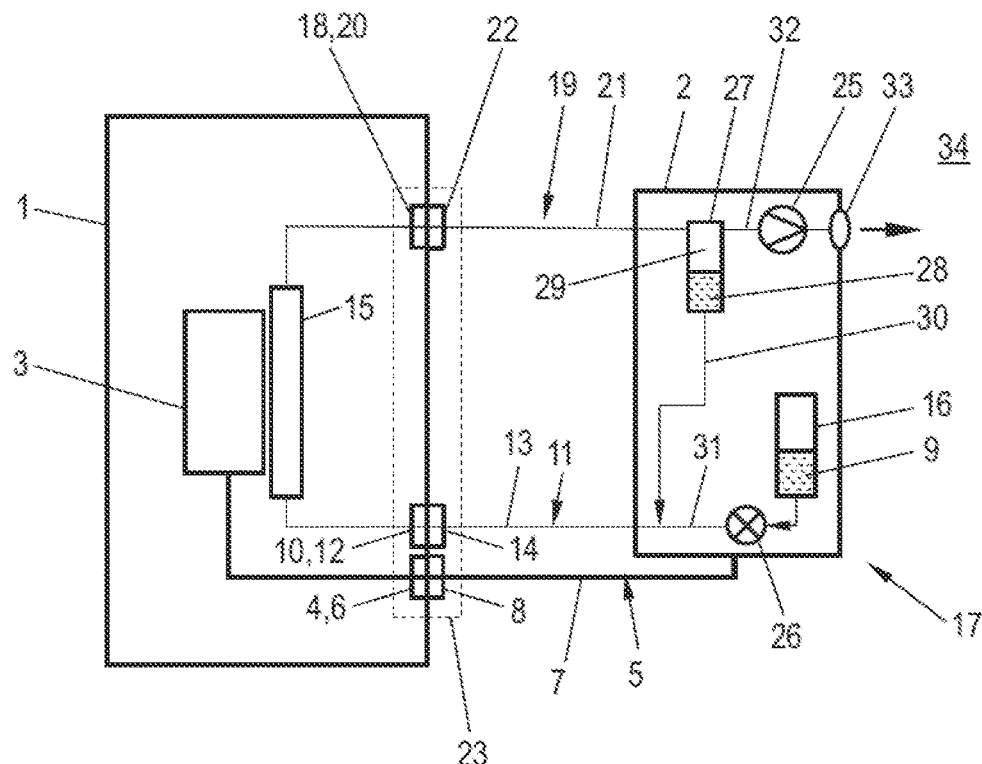
FIG. 2 shows a second embodiment of a motor vehicle and a second embodiment of a charging station to explain a second embodiment of a method.

Although not explicitly shown in FIG. 2, a gas may be supplied to the cooling fluid 9, such as in the region of the cooling fluid reservoir 16 or the pressure reducing element 26, so that a mixture consisting of the cooling fluid 9 and the gas will be present in the circuit 17 at least between the location at which the gas is supplied to the cooling fluid 9 and the phase separator 27 in which the gaseous phase 29 plus gas is taken away. For this purpose, a gas supply line can emerge into a line of the circuit 17, with the gas, say ambient air, being drawn in from the surroundings 34 by means of a gas delivery device of the charging station 2. This aspect regarding the mixture of cooling fluid and gas may be used in the embodiments explained below, since the phase separator 27 is also provided in them.

In the following, the arrangement of FIG. 3 will be explained, corresponding to the arrangement shown in FIG. 2 except for the following explained points. Thus, here as well the phase separator 27 is provided, but by contrast with FIG. 2 it is a component of the motor vehicle 1. This, the motor vehicle 1 and not the charging station 2 comprises the liquid phase discharge line 30, which runs from the phase separator 27 to a cooling fluid line 35 leading to the cooling element 15, so that the liquid phase 28 is supplied to the liquid cooling fluid 9 at the motor vehicle side and before the transfer of the thermal energy. Alternatively, the liquid phase discharge line 30 can lead directly to the cooling element 15. If a natural cooling fluid inflow via the liquid phase discharge line 30 into the intake line section or the cooling fluid line 35 cannot be assured, assistance can be provided by a further delivery element, provided, for example, in the liquid phase discharge line 30. The corresponding delivery element is also provided in this case on the vehicle side.

Moreover, the gas phase discharge line 32 is provided on the side with the motor vehicle 1, running from the phase separator 27 to the return connection or to the return connection interfaces 18, 19, so that the gaseous phase 29 is taken by the return connection to the charging station 2 or to a gas phase discharge line 32 of the charging station 2, in which the delivery device 25 is arranged, and which empties into the gas phase vent opening 33 of the charging station 3. Thus, the system shown in FIG. 3, just like the one shown in FIG. 2, can be called partially closed or partially open.

Figure 3:
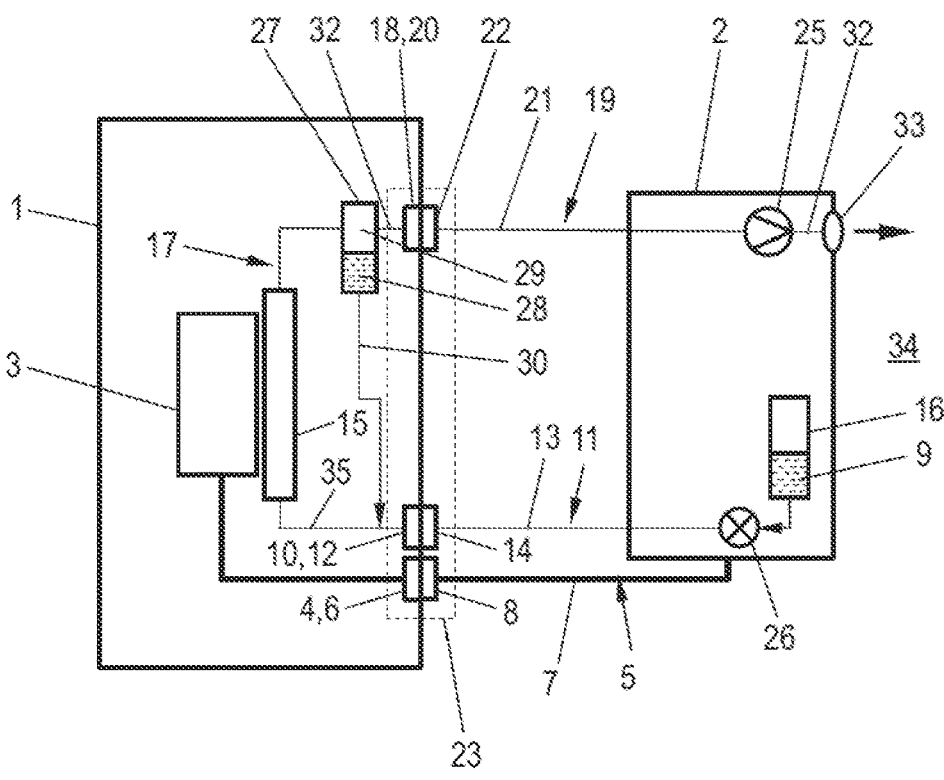
FIG. 3 shows a third embodiment of a motor vehicle and a third embodiment of a charging station to explain a third embodiment of a method.

The circuit 17 in which the cooling fluid 9 circulates, however, is formed solely on the side with the motor vehicle 1 in FIG. 3.

Figure 4:
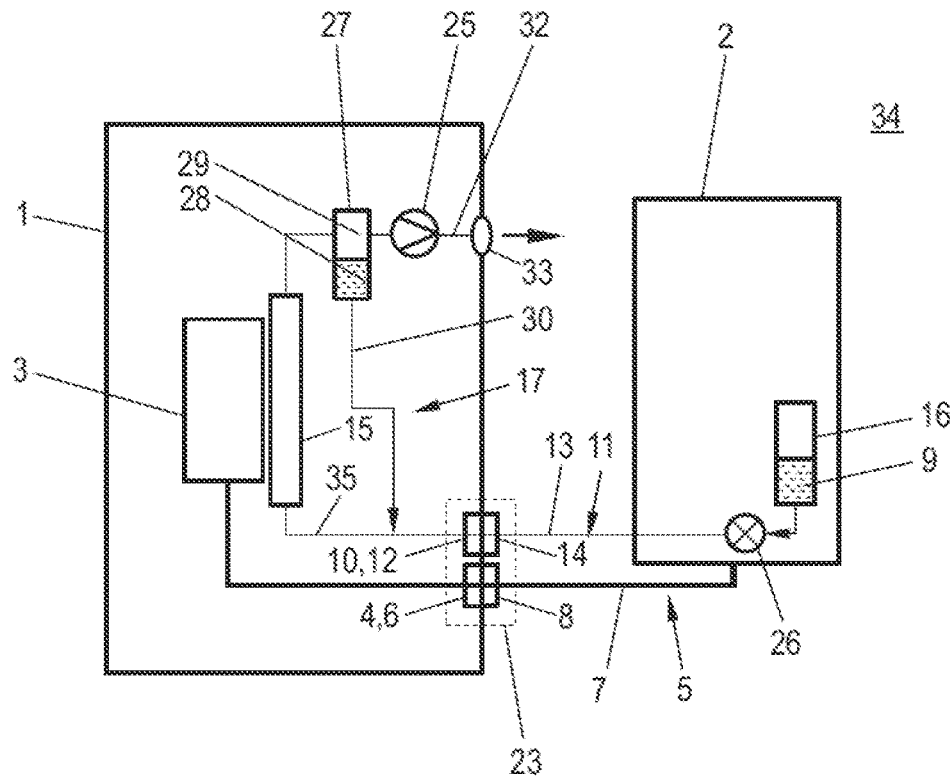
FIG. 4 shows a fourth embodiment of a motor vehicle and a fourth embodiment of a charging station to explain a fourth embodiment of a method.

The arrangement shown in FIG. 4 corresponds generally to that shown in FIG. 3. One difference is that the gaseous phase 29 is not taken from the phase separator 27 across the return connection to the charging station 2, but instead the gas phase discharge line 32 and the gas phase vent opening 33 are each a component of the motor vehicle 1. The same holds for the delivery means 25, which is situated in the region of the gas phase discharge line 32. The gas phase vent opening 33 can be situated at the motor vehicle 1 in the area of the subfloor or the outer skin, such as being covered by means of a scoop.

German patent application no. 10 2021 132152.2, filed Dec. 7, 2021, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for charging at least one electrical energy accumulator of a motor vehicle, comprising:
   transferring electrical energy from a charging station external to the motor vehicle across a detachable electrical connection to the energy accumulator, while a cooling fluid is taken from the charging station across a detachable cooling fluid connection and by a delivery device to at least one cooling element of the motor vehicle, so that thermal energy is transferred from the energy accumulator across the cooling element to the cooling fluid and taken away by the cooling fluid,
   wherein a pressure in the cooling fluid or in a mixture consisting of the cooling fluid and a gas is reduced, before and/or during the supplying thereof to the cooling element, by at least one pressure reducing element, so that the boiling temperature of the cooling fluid is lowered such that it evaporates at least partly during the transfer of the thermal energy.

2. The method according to claim 1, wherein:
   the pressure reducing element is an expansion element and/or a turbine, by which energy can be removed from the cooling fluid or the mixture.

3. The method according to claim 2 wherein the expansion element is a throttle.

4. The method of claim 1,
   wherein electrical energy from a charging station external to the motor vehicle is transferred across a detachable electrical connection to the energy accumulator, while a cooling fluid is taken from the charging station across a detachable cooling fluid connection and by a delivery device to at least one cooling element of the motor vehicle, so that thermal energy is transferred from the energy accumulator across the cooling element to the cooling fluid and taken away by the cooling fluid, and
   wherein the cooling fluid evaporating during the transfer of the thermal energy is circulated at least partly in a circuit in which the cooling element is included.

5. The method according to claim 4, wherein:
   a cooling appliance which cools down the cooling fluid after the transfer of the thermal energy is included in the circuit.

6. The method according to claim 5 wherein the cooling appliance is a condenser.

7. The method according to claim 1, wherein:

the cooling fluid is water or $CO_2$ and/or the gas is ambient air.

8. The method according to claim 1, wherein:

the charging station comprises a cooling fluid reservoir and/or is connected to a cooling fluid source, the cooling fluid being taken by the delivery device from the cooling fluid reservoir or the cooling fluid source to the cooling element.

9. The method according to claim 1, wherein:

the cooling fluid or the mixture is supplied partially or entirely after the transfer of the thermal energy to a phase separator of the motor vehicle or that of the charging station, by which a liquid phase, consisting of the liquid cooling fluid, and a gaseous phase, consisting of the evaporated cooling fluid, of the cooling fluid or the mixture are separated from each other.

10. The method according to claim 9, wherein:

the gaseous phase is discharged into the surroundings and/or the liquid phase is supplied to the liquid cooling fluid before the transfer of the thermal energy.

11. The method according to claim 10, in which the gaseous phase is discharged into the surroundings, wherein:

the gaseous phase is discharged into the surroundings by a gas phase discharge line, leading from the phase separator to a gas phase vent opening of the motor vehicle or the charging station, the delivery device being situated in the region of the gas phase discharge line.

12. The method according to claim 1, wherein:

the cooling element is a cooling plate or a heat exchanger standing in thermal contact with the energy accumulator, by which thermal energy is transferred to the cooling fluid by a coolant circulating in a cooling circuit independent of the charging station for the cooling of the energy accumulator.

13. A motor vehicle, comprising:

at least one electrical energy accumulator, an electrical interface to form a detachable electrical connection, by which electrical energy can be transferred from a charging station external to the motor vehicle to the energy accumulator, a cooling fluid interface to form a detachable cooling fluid connection, by which a cooling fluid can be taken from the charging station by a delivery device to at least one cooling element of the motor vehicle, so that thermal energy can be transferred from the energy accumulator across the cooling element to the cooling fluid and taken away by the cooling fluid, and either:

a pressure reducing element and/or a phase separator, to which the cooling fluid or the mixture can be supplied partially or entirely after the transfer of the thermal energy and by which a liquid phase, consisting of the liquid cooling fluid, and a gaseous phase, consisting of the gaseous cooling fluid and/or the gas, of the cooling fluid or the mixture can be separated from each other.

14. The motor vehicle according to claim 13, comprising the phase separator, wherein:

the motor vehicle comprises a liquid phase discharge line, which leads from the phase separator to the cooling element and/or to a cooling fluid line leading to the cooling element, whereby the liquid phase can be supplied by the liquid phase discharge line to the liquid cooling fluid at the motor vehicle side and before the transfer of the thermal energy; and/or the motor vehicle comprises a gas phase discharge line, leading from the phase separator to a gas phase vent opening of the motor vehicle, whereby the gaseous phase can be discharged into the surroundings by the gas phase discharge line, in which the delivery device is arranged.

15. The motor vehicle according to claim 13, wherein the electrical interface is a charging socket and the cooling fluid interface is a connector.

16. A motor vehicle, comprising:

at least one electrical energy accumulator, an electrical interface to form a detachable electrical connection, by which electrical energy can be transferred from a charging station external to the motor vehicle to the energy accumulator, a cooling fluid interface to form a detachable cooling fluid connection, by which a cooling fluid can be taken from the charging station by a delivery device to at least one cooling element of the motor vehicle, so that thermal energy can be transferred from the energy accumulator across the cooling element to the cooling fluid and taken away by the cooling fluid, and either:

a return connection interface, by which a detachable return connection is formed from the motor vehicle to the charging station, through which the cooling fluid or the mixture can be taken after the transfer of the thermal energy in order to form the circuit; and/or a liquid phase discharge line, which leads from a phase separator to the cooling element and/or to a cooling fluid line leading to the cooling element and by which a liquid phase of the cooling fluid or the mixture can be supplied to the liquid cooling fluid at the motor vehicle side and before the transfer of the thermal energy in order to form the circuit.

17. The motor vehicle according to claim 16, wherein the electrical interface is a charging socket and the cooling fluid interface is a connector.

18. A charging station for charging at least one electrical energy accumulator of a motor vehicle, comprising:

an electrical interface to form a detachable electrical connection, by which electrical energy from a charging station external to the motor vehicle can be transferred to the energy accumulator, a cooling fluid interface to form a detachable cooling fluid connection, by which a cooling fluid can be taken from the charging station by a delivery device to at least one cooling element of the motor vehicle, so that thermal energy can be transferred from the energy accumulator across the cooling element to the cooling fluid and taken away by the cooling fluid, and either:

a pressure reducing element; and/or a phase separator, to which the cooling fluid or the mixture can be supplied partially or entirely after the transfer of the thermal energy and by which a liquid phase, consisting of the liquid cooling fluid, and a gaseous phase, consisting of the gaseous cooling fluid and/or the gas, of the cooling fluid or the mixture can be separated from each other.

19. The charging station according to claim 18, wherein the electrical interface is a charging cable with a plug and the cooling fluid interface is a hose with a connector plug.

20. The charging station according to claim 19, comprising the phase separator, wherein:

the charging station comprises a liquid phase discharge line, which leads from the phase separator to a cooling fluid reservoir and/or to the or a cooling fluid line leading to the cooling fluid interface, wherein the liquid phase can be supplied by the liquid phase discharge line to the liquid cooling fluid at the charging station side and before the transfer of the thermal energy; and/or the charging station comprises a gas phase discharge line, leading from the phase separator to a gas phase vent opening of the charging station, whereby the gaseous phase can be discharged into the surroundings by the gas phase discharge line.

21. A charging station for charging at least one electrical energy accumulator of a motor vehicle, comprising:

an electrical interface to form a detachable electrical connection, by which electrical energy from a charging station external to the motor vehicle can be transferred to the energy accumulator, a cooling fluid interface to form a detachable cooling fluid connection, by which a cooling fluid can be taken from the charging station by a delivery device to at least one cooling element of the motor vehicle, so that thermal energy can be transferred from the energy accumulator across the cooling element to the cooling fluid and taken away by the cooling fluid, and a return connection interface by which a detachable return connection can be formed from the motor vehicle to the charging station, through which the cooling fluid or the mixture can be taken after the transfer of the thermal energy in order to form the circuit, wherein the charging station is configured to transfer electrical energy from the charging station external to the motor vehicle across the detachable electrical connection to the energy accumulator, while the cooling fluid is taken from the charging station across the detachable cooling fluid connection and by the delivery device to the at least one cooling element of the motor vehicle, so that thermal energy is transferred from the energy accumulator across the cooling element to the cooling fluid and taken away by the cooling fluid, and wherein a pressure in the cooling fluid or in a mixture consisting of the cooling fluid and a gas is reduced, before and/or during the supplying thereof to the cooling element, by at least one pressure reducing element, so that the boiling temperature of the cooling fluid is lowered such that it evaporates at least partly during the transfer of the thermal energy.

22. The charging station according to claim 21, wherein the electrical interface is a charging cable with a plug, the cooling fluid interface is a hose with a connector plug, and the return connection interface is a hose with a connector plug.

* * * * *